(12) United States Patent
Bednarz et al.

(10) Patent No.: US 8,307,524 B2
(45) Date of Patent: Nov. 13, 2012

(54) WEATHERSTRIP INSERTION APPARATUS AND METHOD

(75) Inventors: Zachary Bednarz, Honeoye Falls, NY (US); Stephen P. Coriddi, Marion, NY (US); Douglas C. Lead, Clifton Springs, NY (US)

(73) Assignee: Ultrafab, Inc., Farmington, NY (US)

( * ) Notice: Subject to any disclaimer, the term of this patent is extended or adjusted under 35 U.S.C. 154(b) by 615 days.

(21) Appl. No.: 12/459,800

(22) Filed: Jul. 8, 2009

(65) Prior Publication Data

US 2011/0308054 A1 Dec. 22, 2011

(51) Int. Cl.
*B23P 19/02* (2006.01)

(52) U.S. Cl. .............. 29/235; 29/237; 29/238; 269/37; 269/289 R

(58) Field of Classification Search ............. 29/235, 29/237, 238, 243.5–243.58; 269/37, 289 R
See application file for complete search history.

(56) References Cited

U.S. PATENT DOCUMENTS

| | | | | |
|---|---|---|---|---|
| 3,027,629 A | * | 4/1962 | Wrightfield | 29/235 |
| 3,335,487 A | * | 8/1967 | Ellenberg et al. | 29/235 |
| 4,308,653 A | * | 1/1982 | Hinton et al. | 29/235 |
| 4,377,893 A | * | 3/1983 | Buonanno | 29/417 |
| 4,528,736 A | * | 7/1985 | Hope et al. | 29/235 |
| 4,620,354 A | * | 11/1986 | Hess et al. | 29/417 |
| 4,843,701 A |   | 7/1989 | St. Angelo et al. | |
| 4,853,730 A | * | 8/1989 | Kurths | 396/652 |
| 5,103,547 A | * | 4/1992 | Holloway et al. | 29/451 |
| 5,179,774 A | * | 1/1993 | Massie | 29/451 |
| 5,979,036 A | * | 11/1999 | Socci et al. | 29/451 |
| 6,385,833 B1 | * | 5/2002 | Albanese et al. | 29/235 |
| 7,017,268 B2 | * | 3/2006 | Lang | 29/888.3 |
| 7,144,543 B2 |   | 12/2006 | Schwaiger et al. | |

FOREIGN PATENT DOCUMENTS

| DE | 3405512 A1 | 8/1985 |
|---|---|---|
| EP | 0 152 123 | 8/1985 |

* cited by examiner

*Primary Examiner* — George Nguyen
(74) *Attorney, Agent, or Firm* — Kenneth J. Lukacher; Martin Lukacher

(57) ABSTRACT

Weatherstripping is inserted in an extrusion on-line with an extruder which provides the extrusion as it moves towards a station. The extrusion at such station is pulled and cut into sections from which frames of windows are fabricated by fabricators, thereby avoiding the need for insertion of the weatherstrip into the sections offline by the window fabricator. The insertion apparatus includes rollers and an insertion wheel which inserts the weatherstrip into a slot on one side of the extrusion. Rotation of the rollers is coupled to the insertion wheel by a transmission so that the weatherstripping is driven at the same or greater lineal speed than the speed at which the extrusion moves towards the pulling and cutting station, thereby assuring that the weatherstrip reaches the cutter in the cutting station simultaneously with or ahead of the extrusion at the cutter and is not pulled back, which would be the case if the insertion wheel was not rotationally coupled to the rollers and moved at a slower speed than the extrusion due to friction which retards the rotation of the wheel. The sections are filled with weatherstripping along their entire length to facilitate the use thereof by the fabricator in providing components of the frames of the windows being fabricated.

28 Claims, 20 Drawing Sheets

WEATHERSTRIP INSERTION APPARATUS AND METHOD

The present invention relates to an apparatus and a method whereby weatherstripping is inserted into a member which may be used to provide components from which windows and other fenestration products may be fabricated, and particularly to an apparatus and a method for insertion of weatherstripping in-line with the production of the members from which the frames may be fabricated, rather than offline into such members. The on-line insertion of the weatherstripping providing savings in manufacturing costs in the fabrication of the windows over offline weatherstrip insertion.

In the fabrication of members from which frames are fabricated, materials, especially plastic polyvinyls, are extruded with profiles presenting notches for receiving the window panes and slots into which weatherstripping is inserted to provide seals of the window frame (especially the sash at the bottom of the window which closes against a window jamb). Conventionally, wheels are utilized to insert the backing of the weatherstripping into the slot while the sealing portion of the weatherstripping, usually a pile of yarn, projects outwardly from the sash. Such insertion wheels are shown for example in the following U.S. Pat. No. 4,528,736 to Hope et al., issued Jul. 16, 1985; U.S. Pat. No. 4,843,701 to St. Angelo, issued Jul. 4, 1989; U.S. Pat. No. 5,103,547 to Holloway et al., issued Apr. 14, 1992; and U.S. Pat. No. 5,979,036 to Socci, issued Nov. 9, 1999. When such insertion wheels are used in inserting weatherstripping into a weatherstripping receiving slot (T-slot) of a moving member, such as an extrusion being fed from an extruder, the frictional forces on the weatherstripping and the insertion wheel prevent the weatherstripping from moving at the same speed as the extrusion. When the extrusion reaches the station where it is cut into sections at the end of the extrusion production line, the weatherstripping is spaced from the end which is cut off by the cutter in the cutting station. This spacing is referred to as pullback. Pullback is of particular concern when the fabrication of windows and doors requires slippage of the weatherstripping in the T-slot so that the position of the weatherstripping can be adjusted.

It is desirable that pullback be avoided since when the ends of the extrusion and the weatherstripping are not aligned, the fabrication of the sash and other frame components by the fabricator is difficult or impossible and creates higher scrap rates. For example, the mitered ends of the frame may be left without weatherstripping and a complete seal between a sash and a jamb is lost. Accordingly, insertion of weatherstripping on-line as the extrusions are produced has not been practical and weatherstripping insertion has been carried out offline, for example with apparatus such as shown in Albanese et al., U.S. Pat. No. 6,385,833, issued May 14, 2002.

It is a principal feature of the present invention to provide an apparatus and a method for weatherstrip insertion which may be carried on-line in the process of making the members, such as extrusions, from which window frames and other fenestration products may be fabricated, thereby avoiding the additional labor and equipment for offline weatherstrip insertion which has been used by fabricators of windows and such other fenestration products.

It is another feature of the invention to provide an apparatus and a method for weatherstrip insertion into a moving member, such as an extrusion, that is cut off at a cutting station which avoids pullback of the weatherstripping from the cut off end of the member during in-line production of the member or extrusion sections.

Briefly described, the invention provides an apparatus and a method for inserting weatherstripping into a slot in a member (or extrusion) from which frame components of windows may be fabricated as the member is produced and moves in a linear path away from the production equipment, such as an extruder in which the extrusion is formed. A roller is pressed against the side of the member or extrusion so that the roller is rotated by the member as it moves along the path away from the extruder towards a cutting station, a transmission transfers rotary motion from the roller to an insertion wheel so that the wheel is driven at a speed where the weatherstripping driven by the wheel moves at least at the same speed as the extrusion. When the extrusion reaches a cutting station, the weatherstripping is not pulled back and is in alignment with the end of the member which is cut off into sections. Such sections may be called lineals and are sold, as products by the extrusion manufacturer with inserted weatherstripping, to fabricators of windows and other fenestration products. When the weatherstripping is smaller in cross-sectional area than the T-slot in the lineals and can slip therein, the fabricator can readily adjust the position of the weatherstripping in the slot to facilitate manufacture of windows and doors.

The foregoing and other features, objects, and advantages of the invention will become more apparent from a reading of the following description in connection with the accompanying drawings in which.

Figure 1:
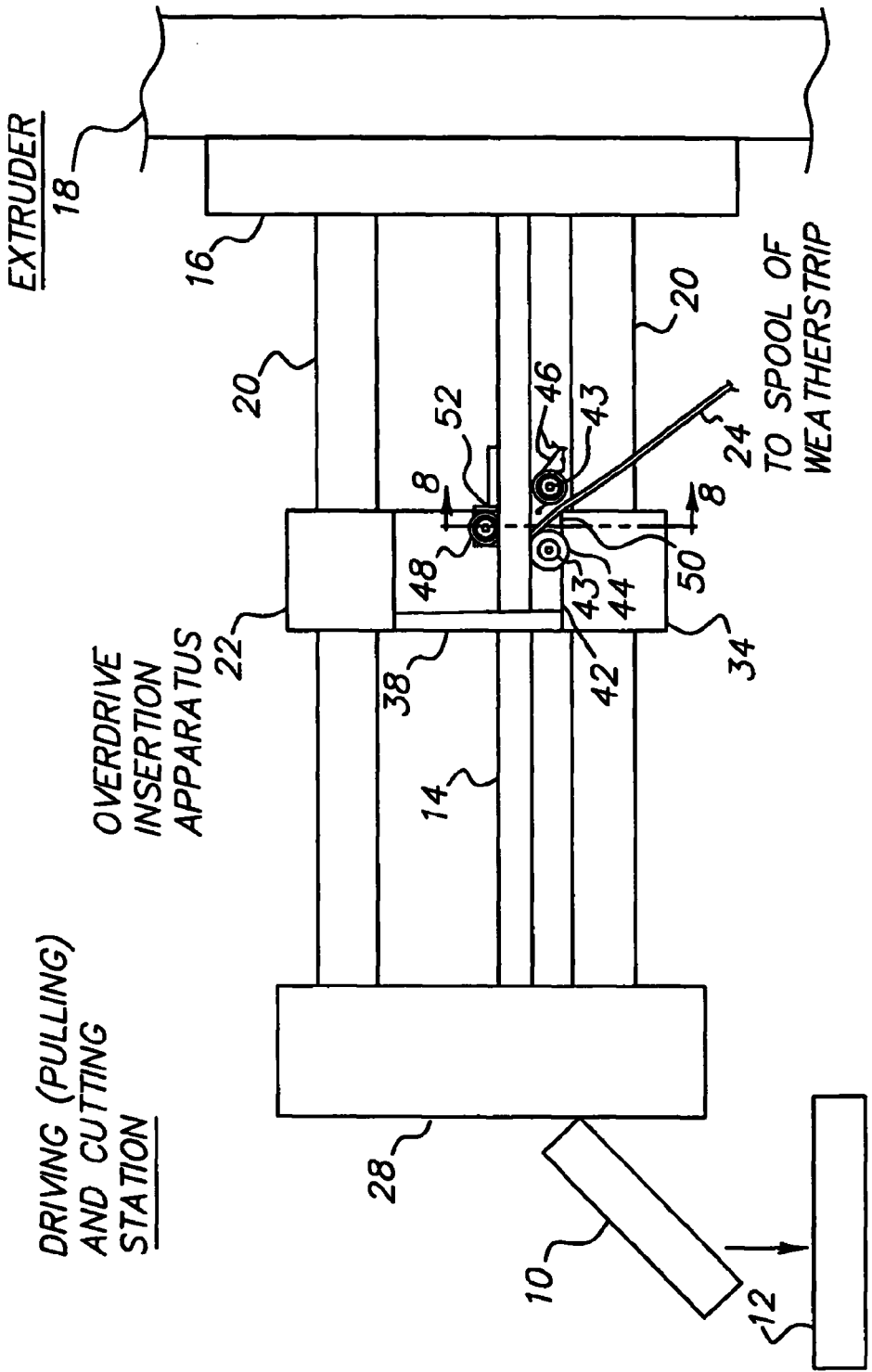
FIG. 1 is a plan view of an extrusion production line with apparatus for inserting weatherstripping into the extrusion as it moves towards a driving and cutting station where the extrusion is cut into lineals for use in the fabrication of windows and other fenestration products.
Figure 2:
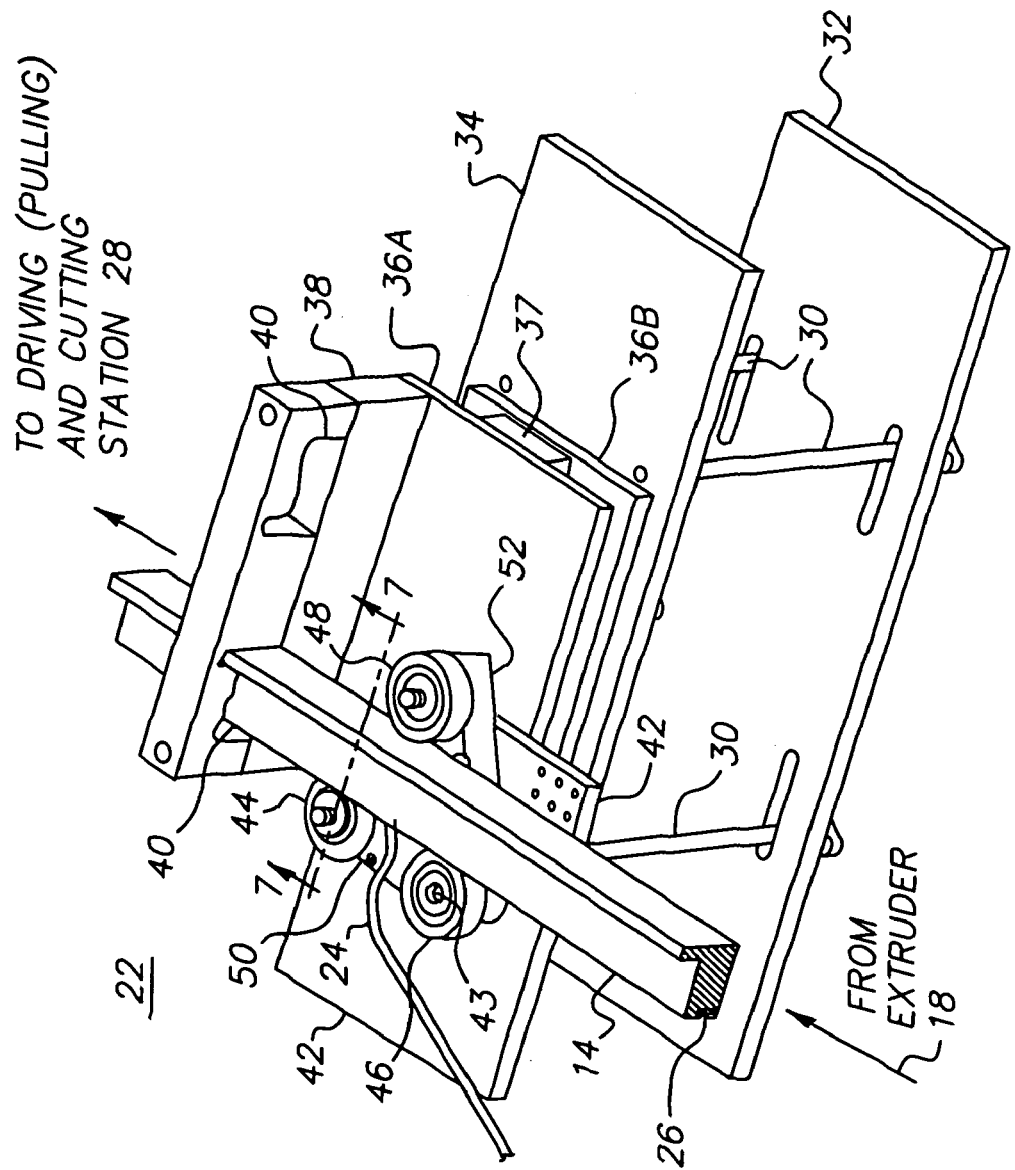
FIG. 2 is a perspective view from the top showing parts of the extrusion line in the vicinity of the insertion apparatus illustrated in FIG. 1.

Referring to FIGS. 1 and 2, there is shown apparatus for producing lineals which are extrusion sections 10 shown dropping into a carriage 12 and which may contain a plurality of said such sections which are cut from an extrusion 14 fed from the tank 16 of an extruder 18. The extrusion profile is formed by dies (not shown) which define the cross sectional shape or profile of the extrusion 14. While one extrusion is being shown, two may desirably be made simultaneously, the other not being shown in the drawing to simplify the illustration. Support legs 20 support an overdrive insertion apparatus 22 which inserts weatherstripping 24, which is pulled from a reel continuously as the extrusion is produced. This weatherstripping 24 is inserted by the apparatus 22 into a slot in the weatherstripping which is a T-slot of the type shown, for example, in the above referenced Hope, Socci, and Albanese patents and also at 26 in FIG. 7.

The extrusion 14 has cooled and the profile thereof is fixed by the time the extrusion moves from the extruder to the insertion apparatus 22. The extrusion 14 is driven (pulled out of the extruder 18), for example, by rollers which clamp the side surfaces thereof and cut at a driving, pulling, and cutting station 28. The driving station may include the pulling rollers and a cutter, where the cutter may be a cutting wheel, spaced downstream from the driving rollers so that the driving rollers remain in contact with extrusions after they are cut off by the cutter. The driving and cutting facilities may be similar to those shown in the Albanese patent (FIG. 1 thereof). The extrusion 14 is therefore advanced in the downstream direction (toward the left of FIG. 1) at a constant speed.

Referring more particularly to FIG. 2, the insertion apparatus 22 is mounted on an assembly of plates 42, 36A and 36B and spacer 37. This assembly is carried on a support plate 34. A set of rods 30 are threaded into holes (not shown) in the plate 34 and mount the plate 34 to the support legs 20 or another plate 32 (as shown) mounted on the legs 20. The support plate 36a supports an upright member 38 having guide holes 40 through which the extrusion 14 passes and is supported. The hole 40 on the right in the upright 38 is for another extrusion not shown in the illustration. Carried on the support plate 36a is a plate 42 which mounts a weatherstrip insertion wheel 44 and rubber tired rollers 46 and 48 which engage opposite sides of the extrusion 14 and are rotated by the extrusion.

The rotation of the rollers 46 and 48, as they are driven by the moving extrusion 14, is transferred to the insertion wheel 44 by gear transmissions in arms 50 and 52 which are pivotable about the rotation axis of the roller 46 and are yieldably biased toward each other so as to press against the opposite sides of the extrusion 14. The assembly of wheel 44, rollers 46, and the pivotal arms 50 and 52 is mounted on a post 43 connected to the support plate 36 and on which the wheel 44 is journaled for rotation, as shown in FIG. 2.

Figure 7:
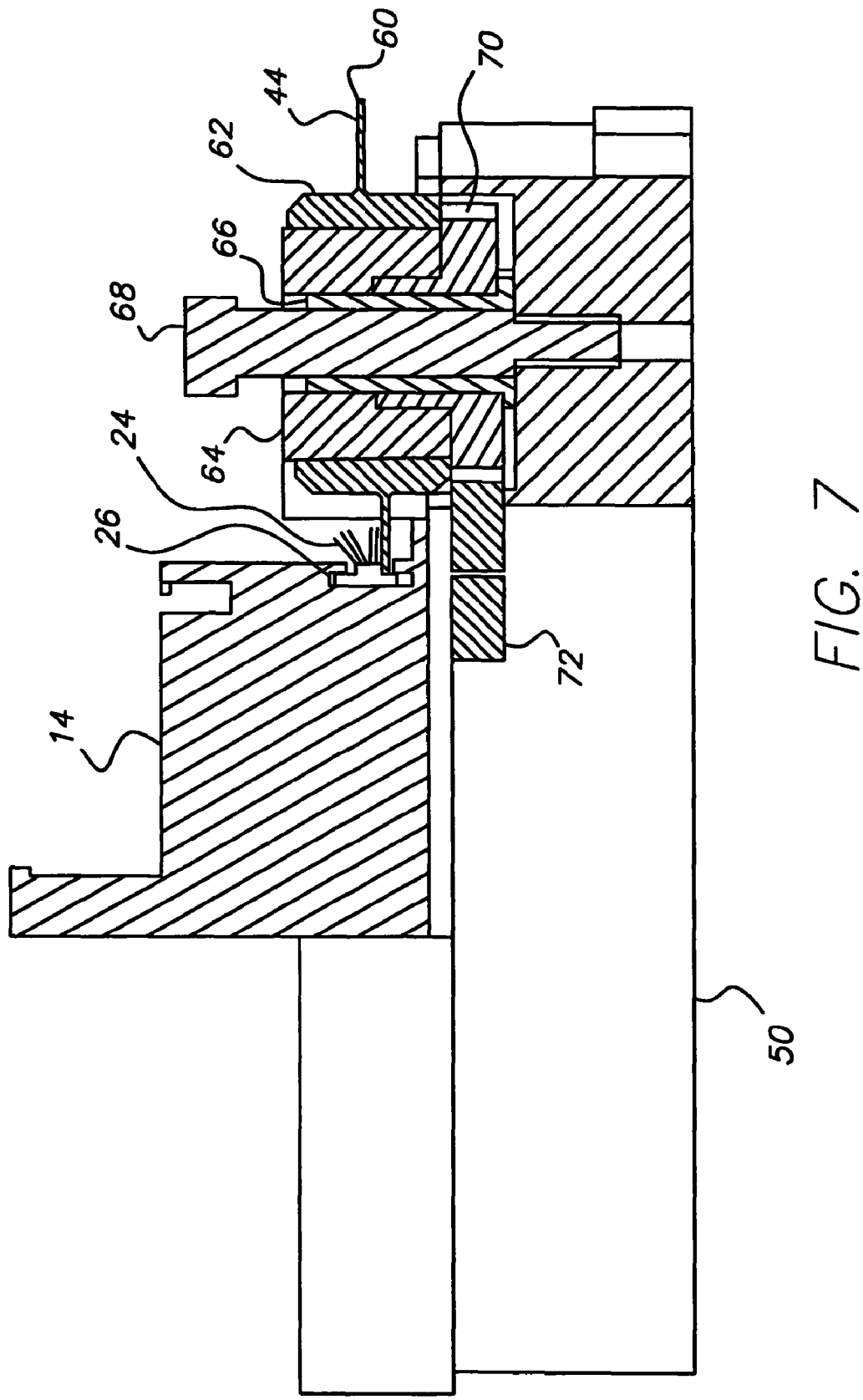
FIG. 7 is a sectional view through the axis of the roller taken along line 7-7 in FIG. 2.
Figure 9:
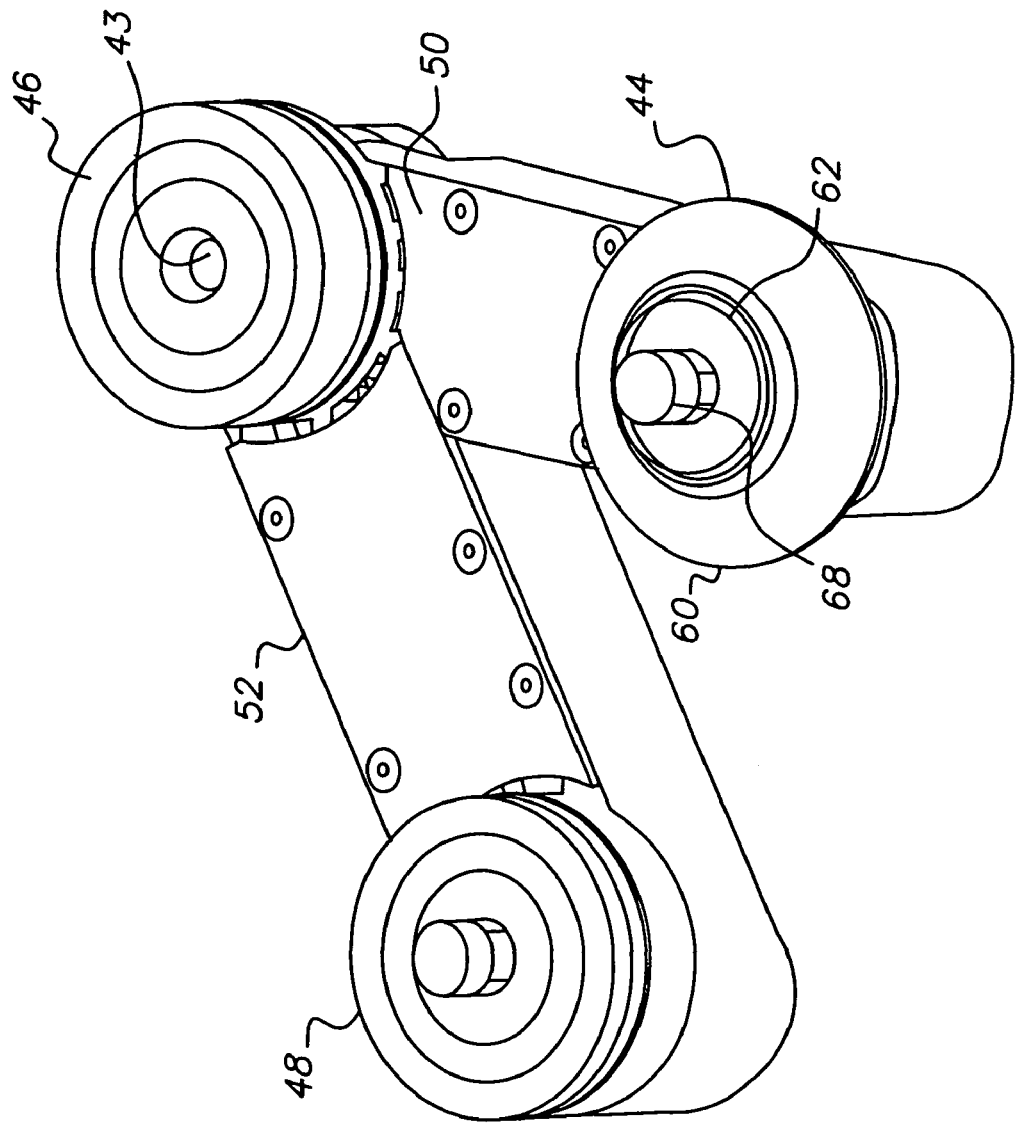
FIG. 9 is a simplified perspective view illustrating the rollers, the insertion wheels mounted on the arms which is a component of the insertion apparatus provided by the invention.
Figure 10:
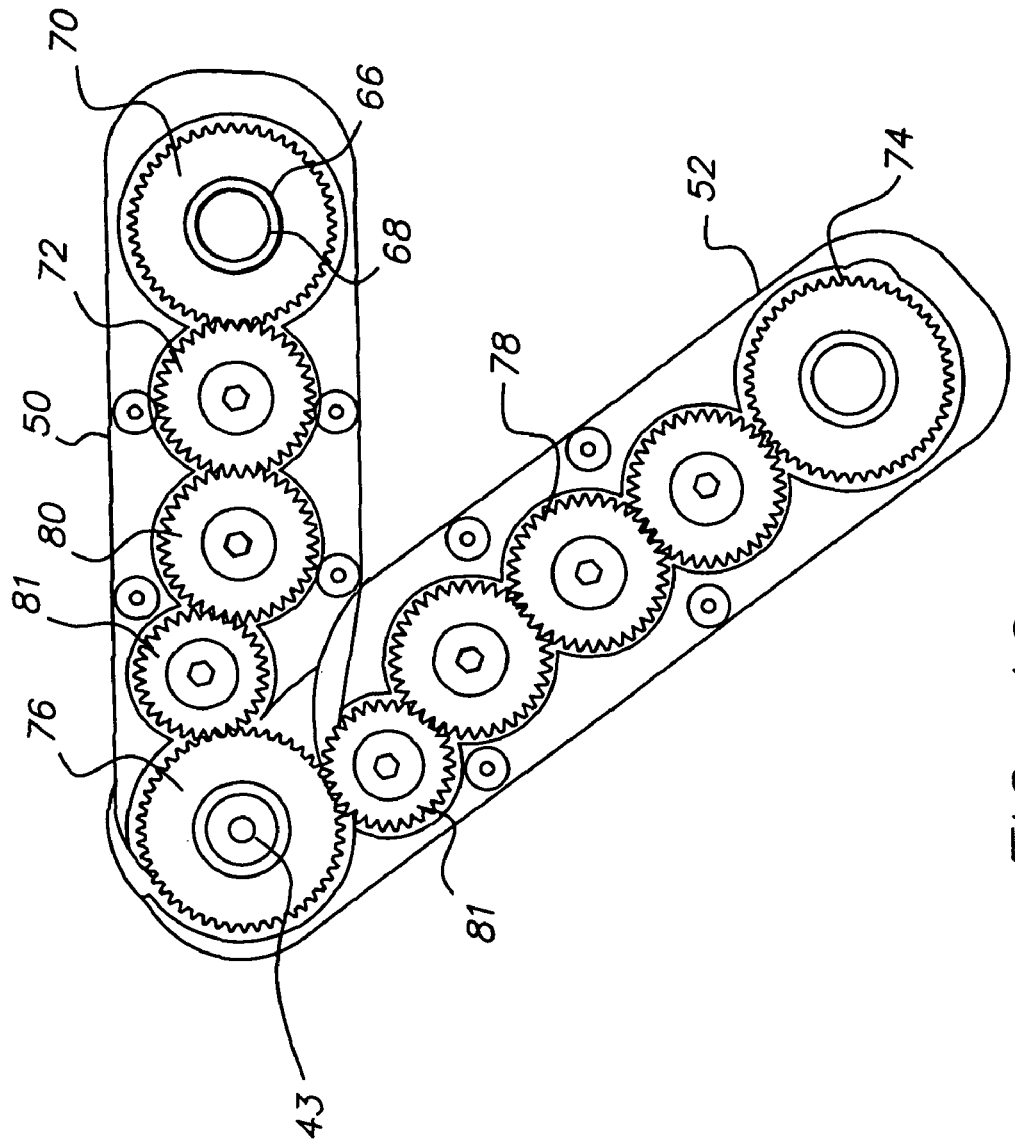
FIG. 10 is a view through the arms showing the gear train transmissions in the arms which couple the rotation of the rollers to the insertion wheel for directly driving the insertion wheel so that its lineal (tangential) speed of the periphery of the wheel is the same as or greater than the speed of the extrusion as it moves between the extruder towards the driving and cutting station.
Figure 11:
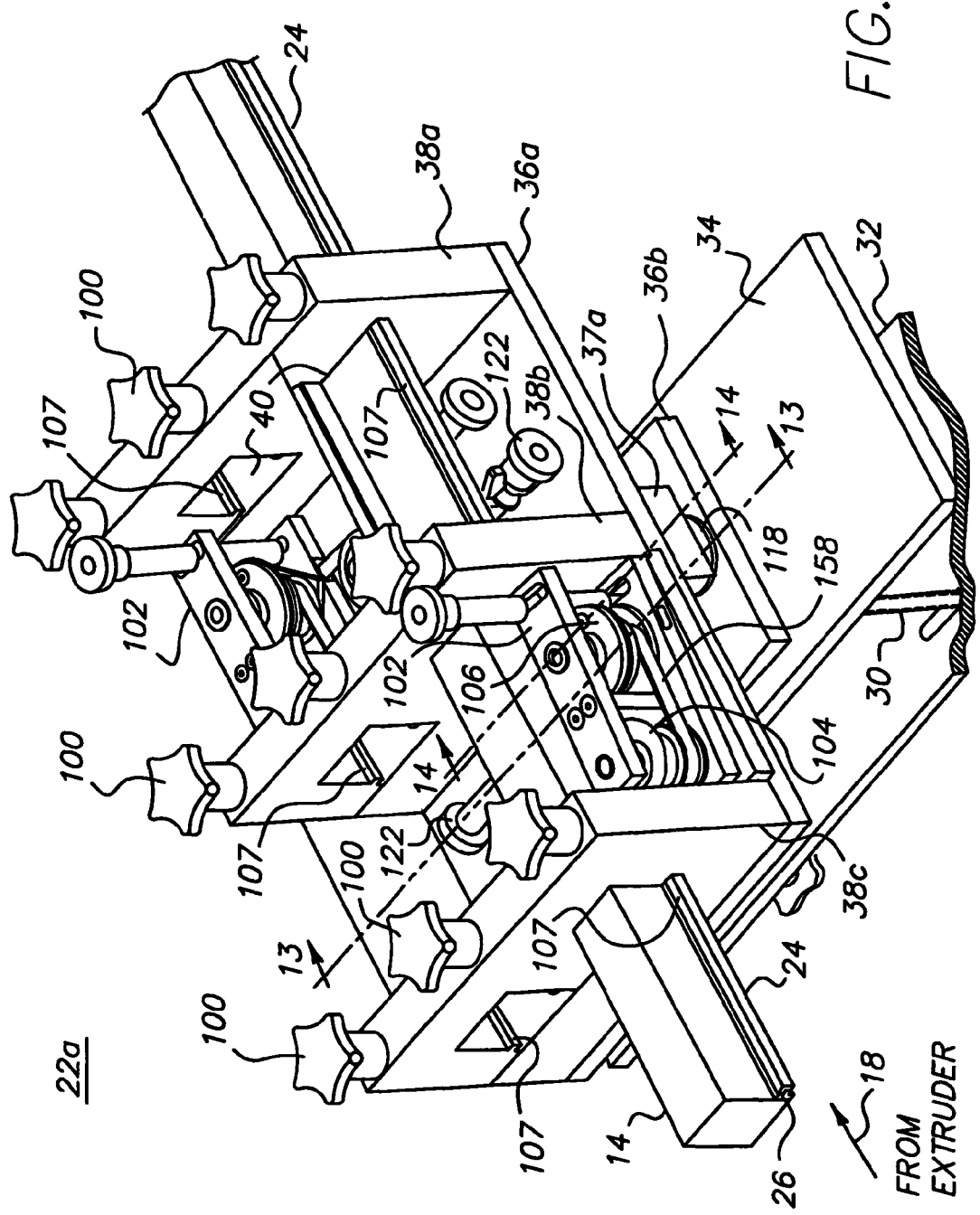
FIG. 11 is a perspective view showing insertion apparatus provided in accordance with a presently preferred embodiment of the invention, the view being taken looking downwardly toward the insertion apparatus and showing the apparatus mounted on support plates similar to the insertion apparatus shown in FIGS. 1-10.
Figure 12:
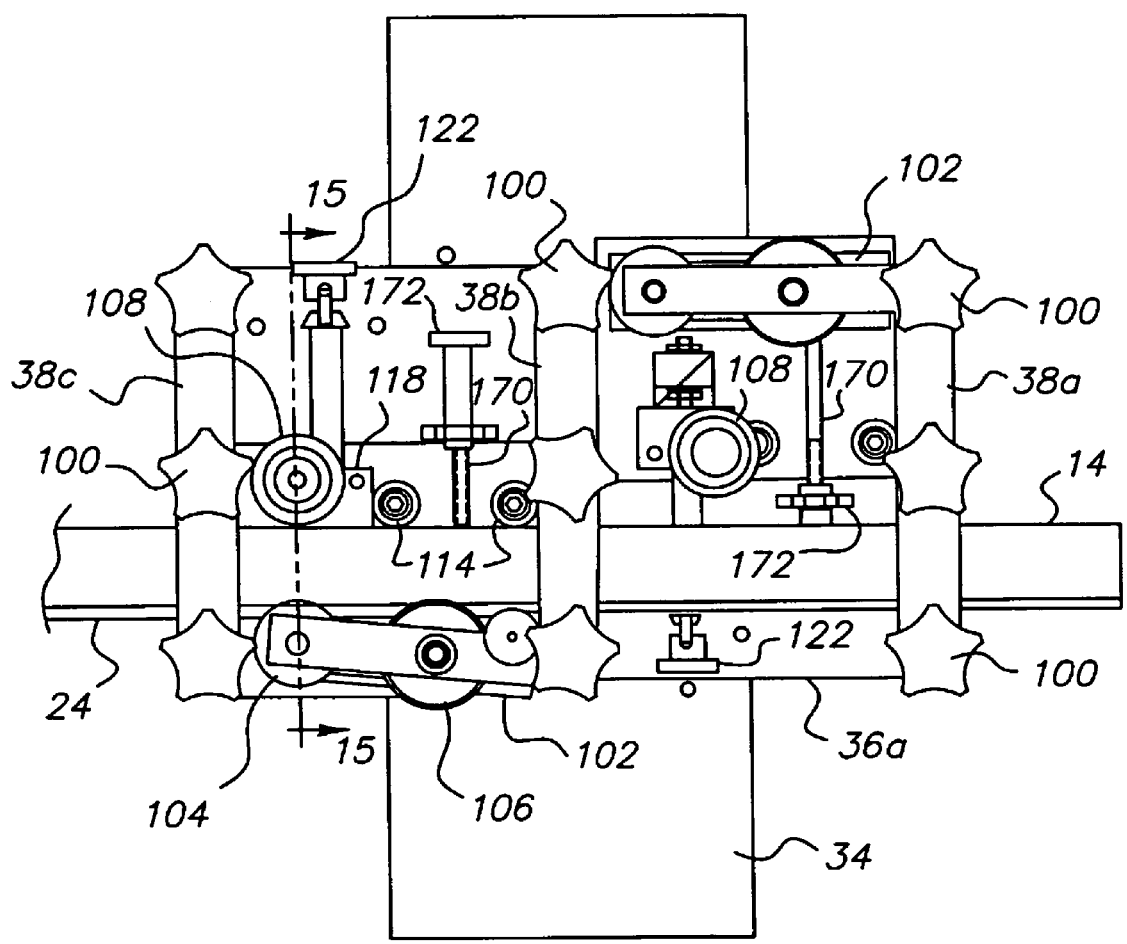
FIG. 12 is a plan view of the insertion apparatus shown in FIG. 11.

As shown in FIG. 9 and also in FIGS. 3, 4, 5, and 6, the wheel 44 has a disk section 60 extending from a sleeve 62, which is press fit on a collar 64 (see FIG. 7). A bushing 66 is rotatable on a shaft 68. A drive gear 70 is press fit between the bushing 66 and the collar 64. The wheel 44 including its disk 60, sleeve 62, and collar 64 all are rotated by the drive gear. The drive gear is connected to a spur gear 81 (see also FIG. 10) which is part of a gear train transmission which couples the rotation of the rollers, via gears 74 and 76 and which rotate with the rollers 46 and 48. This transmission includes a gear train 78 between the rollers 46 and 48 in the arm 52 and a gear train 80 between the wheel 44 and the roller 46 in the arm 50. The gear 76 which is coupled to the wheel 44 is common to both gear trains and locks both gear trains in driving relationship. The gear ratios are selected so that the wheel rotates at a rotational velocity which makes its tangential velocity equal to or slightly greater than the lineal velocity of the extrusion 14. This ensures that the weatherstripping 24 will be driven faster than the feed velocity of the extrusion and will extend up to and in alignment with or past in the downstream direction the end of the extrusion which is cut off at the driving and cutting station 28 (FIG. 1).

Figure 8:
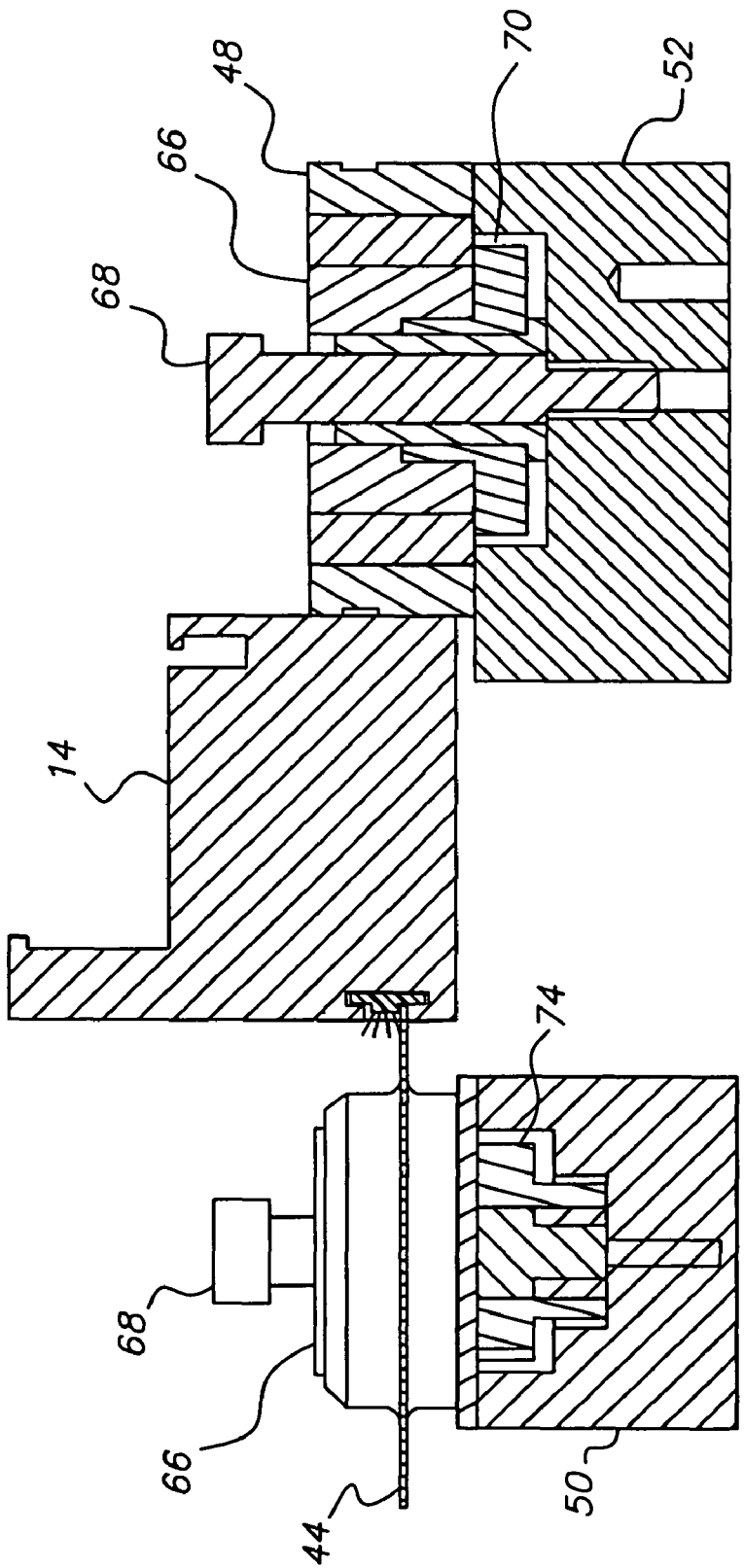
FIG. 8 is a sectional view through the roller engaging the opposite side of the extrusion from the side thereof engaged by the insertion wheel and the other roller, the view being taken along the line 8-8 in FIG. 1.

As shown in FIG. 9, the rollers 46 and 48 are of the same diameter, and are provided by compliant (rubber) rings on sleeves rotatable on bushings, as shown in FIG. 8. The bushings journal the sleeves of the rollers in the arm 52 as shown in FIG. 8.

Figure 3:
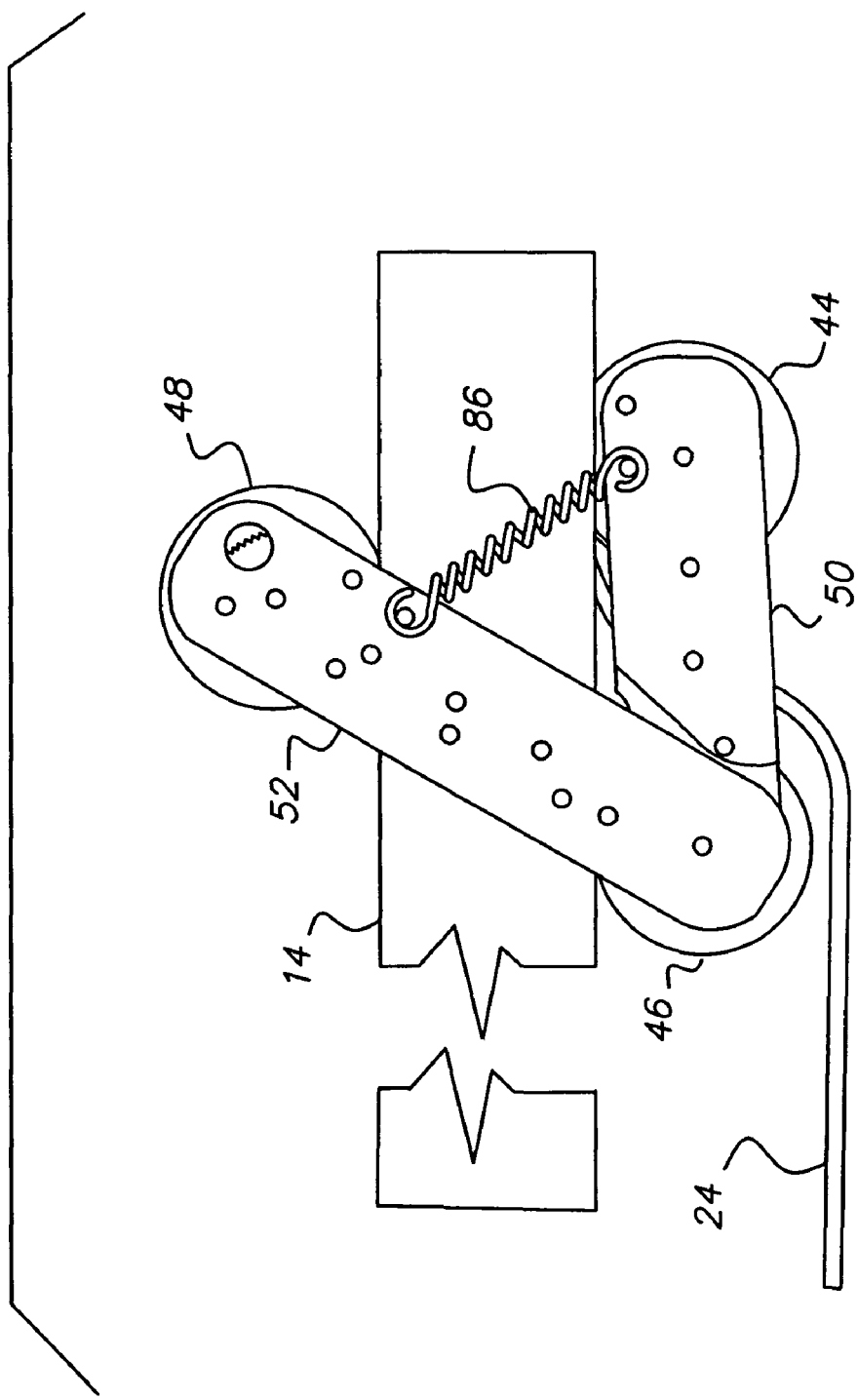
FIG. 3 is a view from the bottom of the rollers, insertion wheel, and arms of the insertion apparatus whereby the rollers are pressed against the extrusion as the weatherstrip is inserted by the insertion wheel, the view being taken looking upwardly from below the rollers, insertion wheel, and arms supporting the rollers and wheels in FIG. 2.
Figure 4:
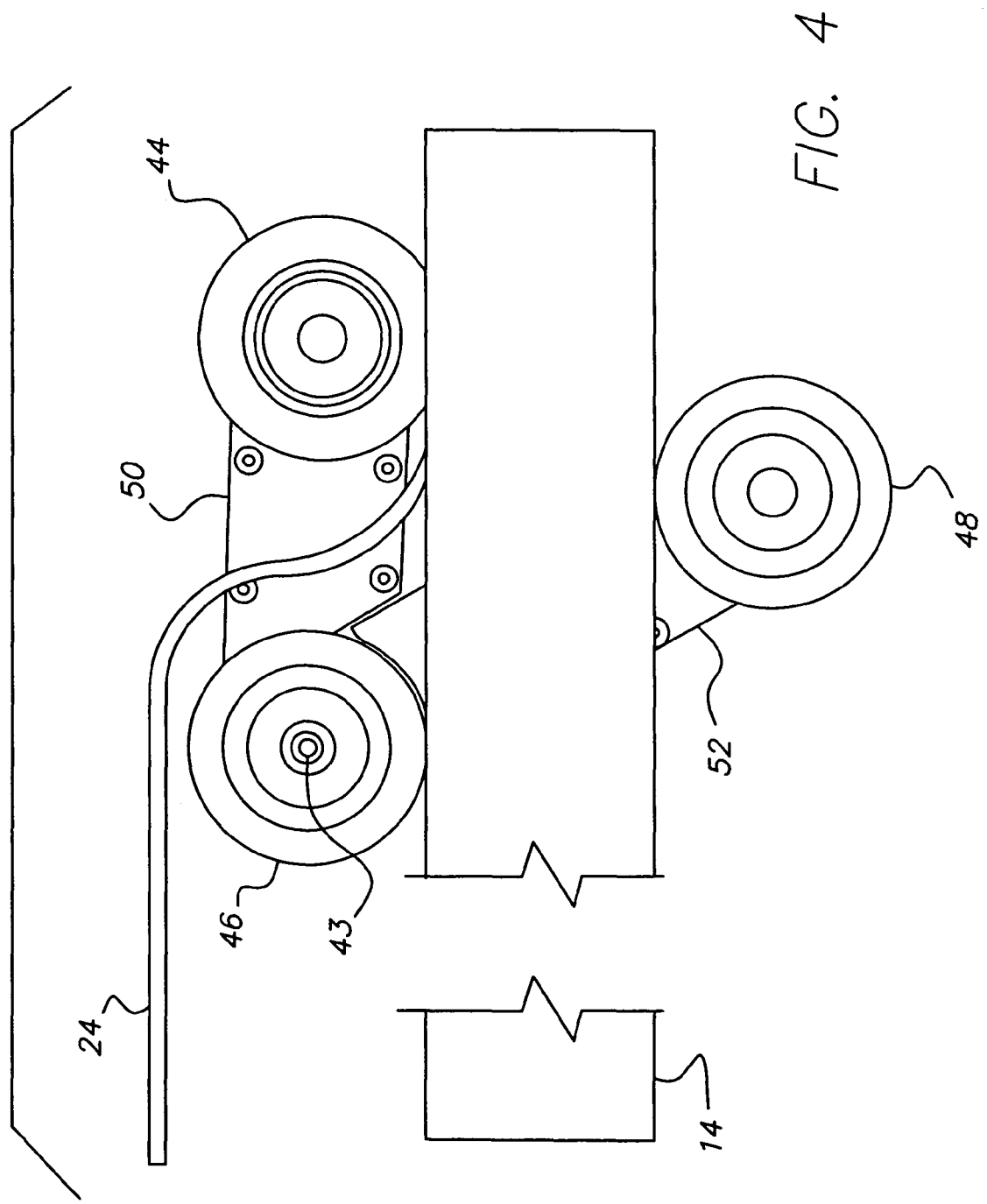
FIG. 4 is a view of the insertion apparatus, insertion wheel, and rollers shown pressed against opposite sides of the extrusion taken from above the extrusion as shown in FIG. 2.
Figure 5:
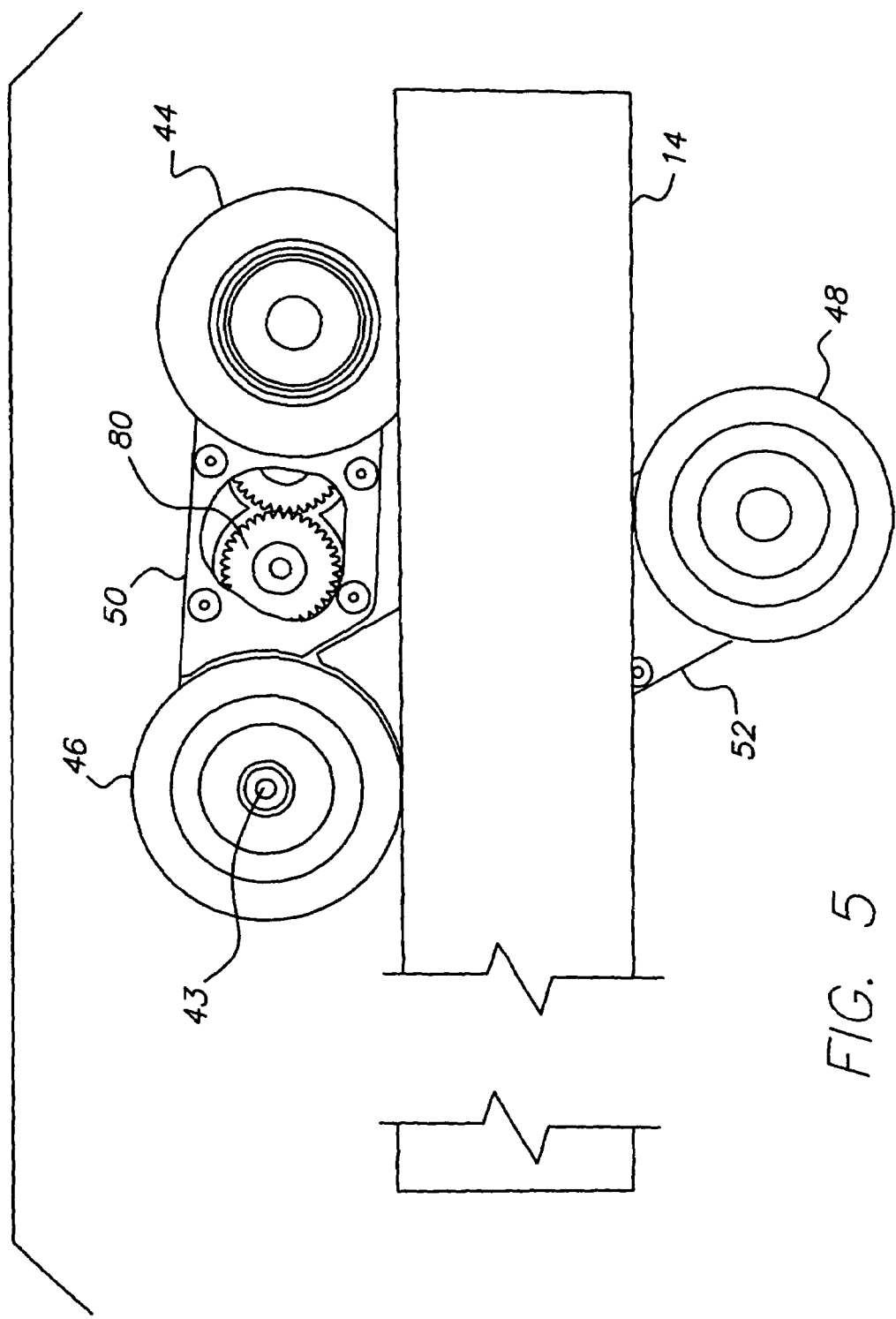
FIG. 5 is a view similar to FIG. 4 wherein one of the arms is broken away to illustrate the location of the gear train transmission transferring the rotation of the rollers to the insertion wheel.
Figure 6:
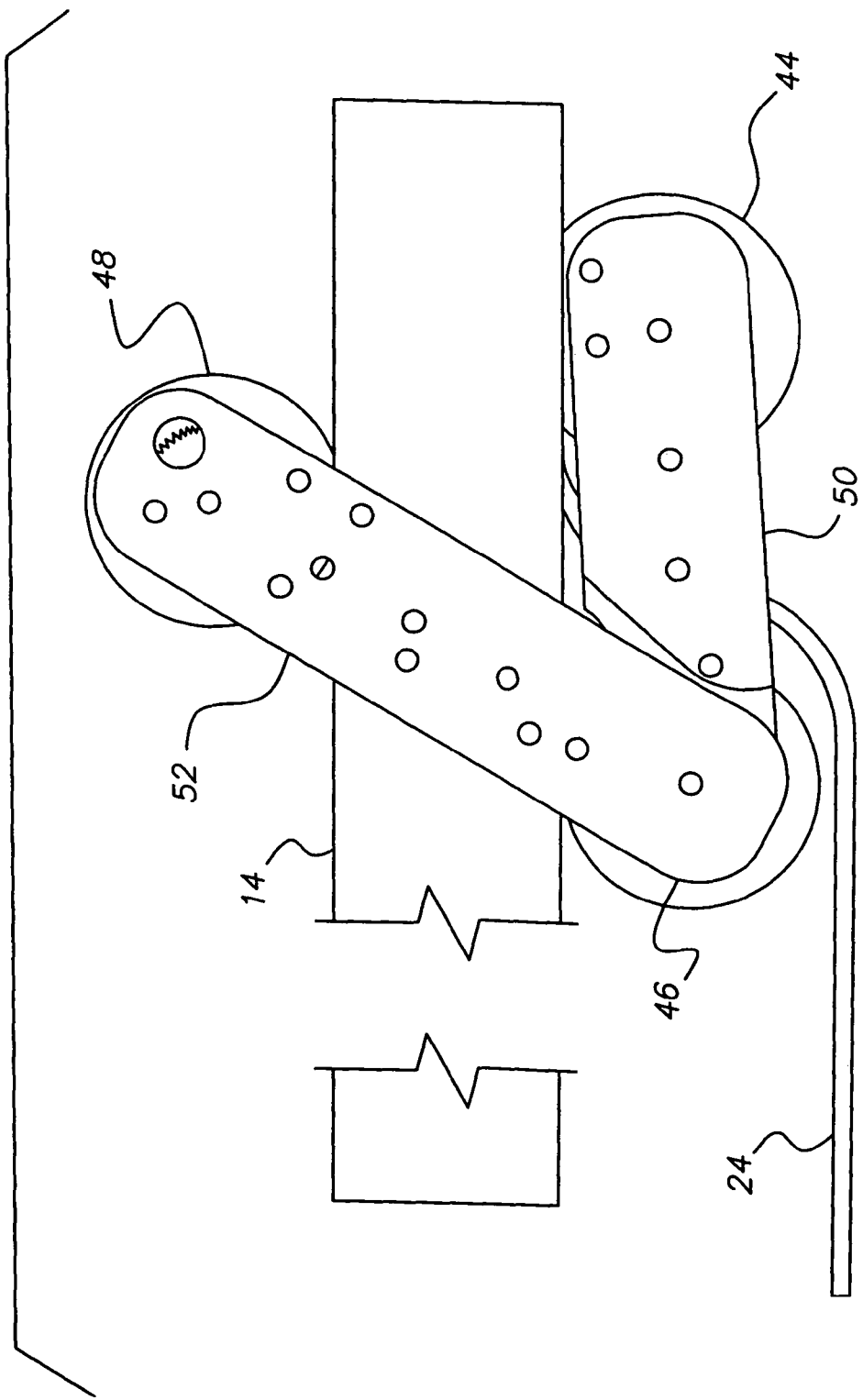
FIG. 6 is a view similar to FIG. 3, but with the spring shown in FIG. 3 removed.

The arms 50 and 52 are pivotably mounted on the axis of the shaft carrying the roller 46. The arms 50 and 52 are yieldably biased toward each other by an interconnecting spring 86 as shown in FIG. 3.

In operation, the arms are pivoted away from the extrusion 14 to allow the extrusion to pass between the rollers 46 and 48 and also between the roller 48 and the insertion wheel 44. The tension in the compression spring 86 is sufficient to continuously press the rollers 46 and 48 against opposite sides of the extrusion 14 and to hold the wheel 44 in the slot in the extrusion so as to snap the weatherstrip 24 backing into the slot 26 and hold it in the wide part or base of the T portion thereof. The wheel 44 then drives weatherstripping 24 at a speed equal to or slightly greater than the speed of the extrusion 14. The weatherstrip 24 is movable (slippable) lengthwise of the extrusion since the base of the weatherstrip is slightly smaller than the bottom of the T-slot 26. This assures that the weatherstrip will not pull back at the end where it is cut off by the cutter in the cutting station 28.

Rotation of the rollers is coupled to the insertion wheel by transmissions provided by gear trains carried in the arms 50 and 52 so that the weatherstripping 24 is driven at the same or slightly greater lineal speed than the speed at which the extrusion 14 moves towards the cutting station 28, thereby assuring that the weatherstrip 24 reaches the cutter in the cutting station simultaneously with the extrusion 14 at the cutter and is not pulled back, which would be the case if the insertion wheel was not rotationally coupled to the rollers and moved at a slower speed than the extrusion due to friction which retards the rotation of the wheel. Thus, the cut sections of extrusion 14 are filled (substantially aligned at ends of sections) or overfilled (extend past ends of sections) with weatherstripping 24 along their entire length to facilitate the use thereof by the fabricator in providing components of the frames of the windows being fabricated. Accordingly, weatherstrip 24 is inserted on-line and sections 10 (lineals) of the extrusion are produced continually with weatherstrip 24 inserted as the extrusions 14 are fed from the extruder 18.

The preferred embodiment of the invention illustrated in FIGS. 11-20 provides an overdrive insertion apparatus 22a which inserts weatherstripping 24 into extrusions 24a and assures non-slip operation of the insertion apparatus as well as flexibility of the apparatus in accommodating extrusions 14 of various profiles (cross-sectional shapes).

To the extent that the insertion apparatus shown in FIGS. 11-20 contains components and parts similar to the components and parts of the insertion apparatus 22 described in connection with FIGS. 1-10, these parts and components are identified with like reference numerals.

The extrusion member pulled from the extruder 18 is guided in openings of three guide plates 38a, b, and c. Only one extrusion member 14 is illustrated. Another extrusion member may be accommodated in the openings of the guide plates along side the openings through which the extrusion member 14 is guided and driven by the driving (pulling) and cutting station 28 (FIG. 1). The guide plates 38a, b, and c have upper and lower sections, the upper section being removable for locating the extrusions 14 and then clamped in place by threaded rods which extend into the support plate 36a and are held in clamped relationship thereon by threaded rods having sets of three knobs 100 thereon.

Figure 13:
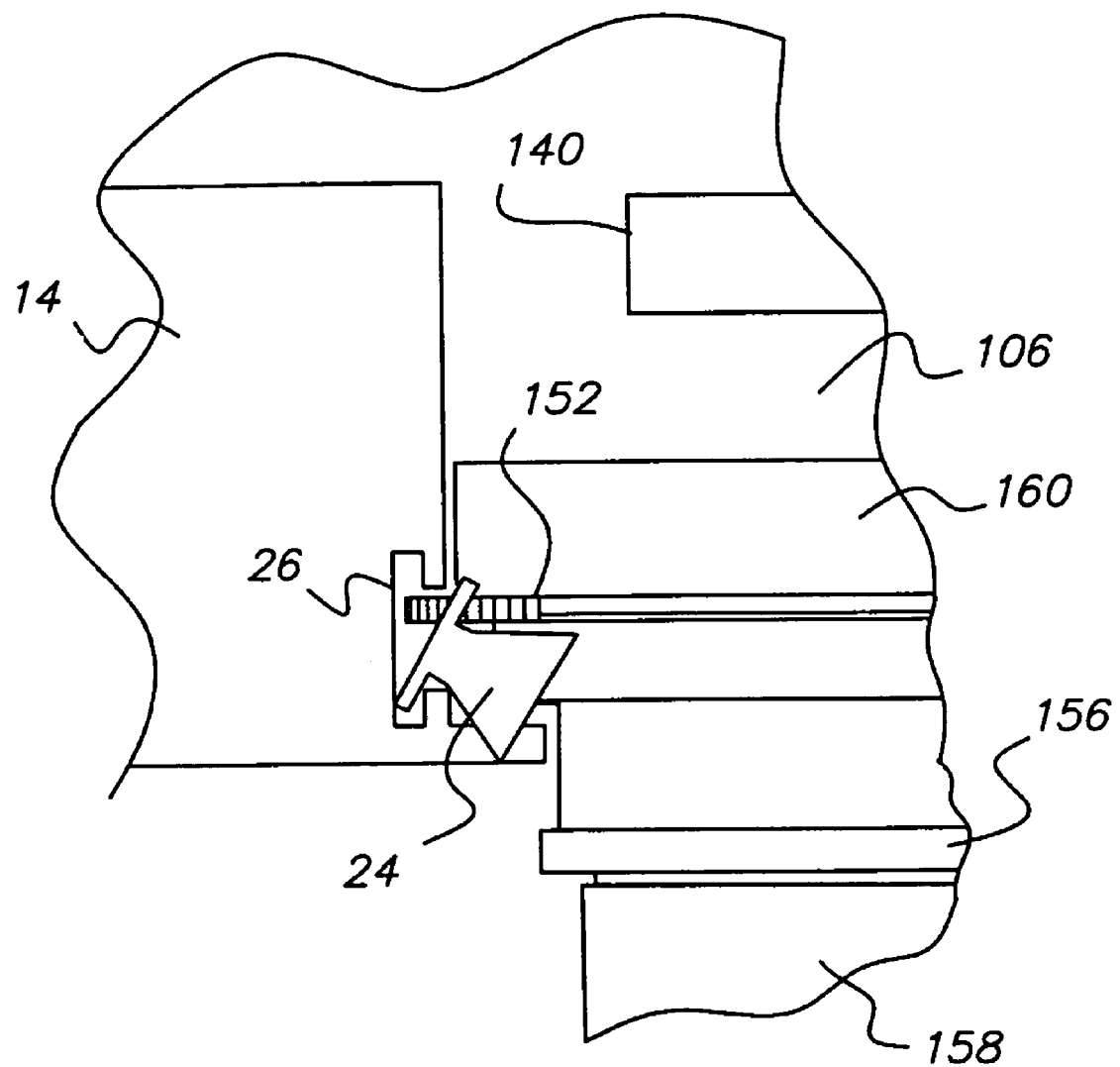
FIG. 13 is a fragmentary view showing the insertion apparatus in process of inserting a weatherstrip into an extrusion member, the view being taken along the line 13-13 in FIG. 11.
Figure 14:
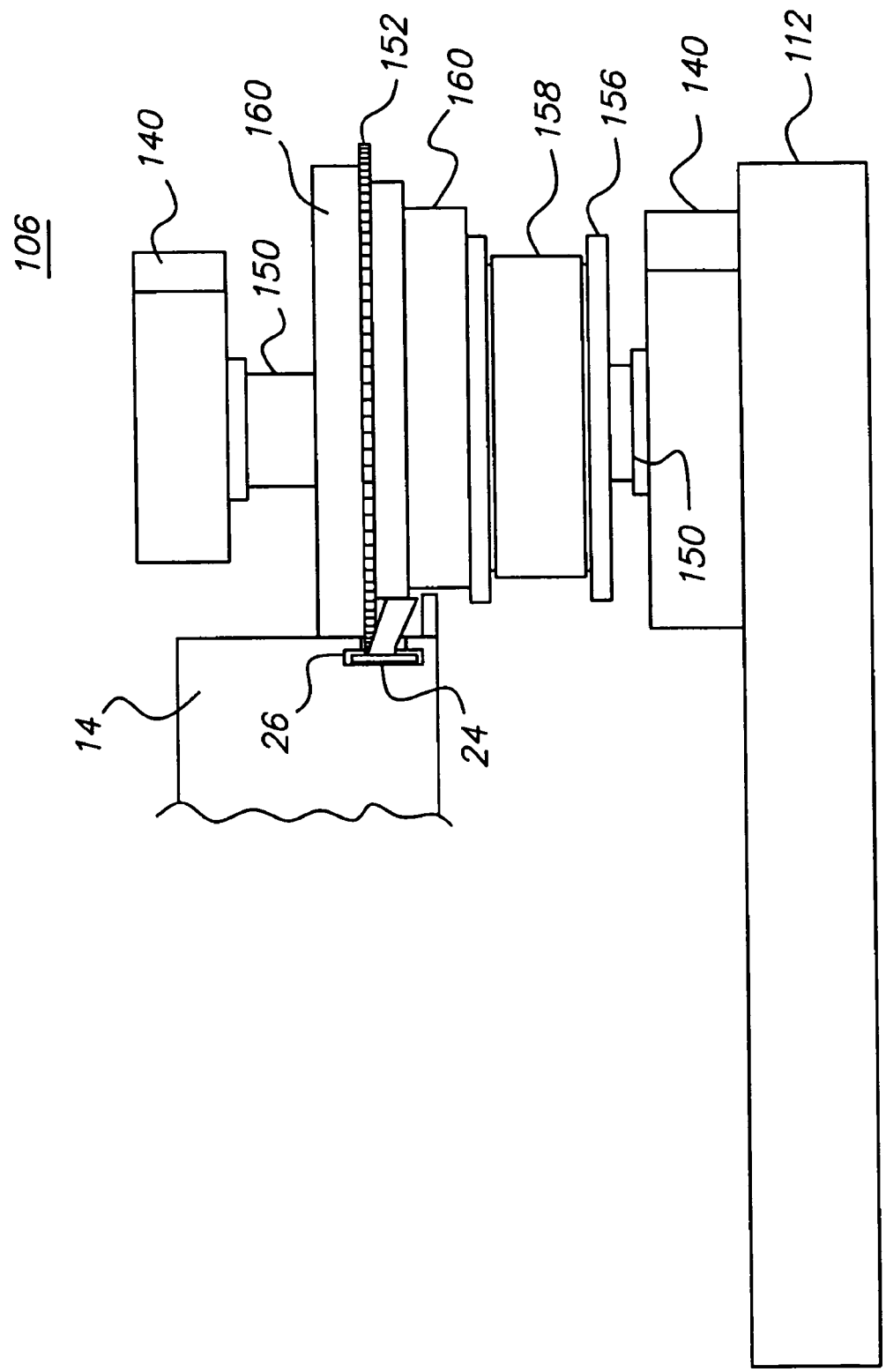
FIG. 14 is another fragmentary sectional view showing the insertion apparatus in process of inserting a weatherstrip into an extrusion member, the view being taken along the line 14-14 in FIG. 11.

Initially, the weatherstripping 24 having its pile sealing member on a backing is located with one edge of the backing in the T-slot 26 as shown in FIG. 13. The insertion apparatus both inserts and drives the weatherstrip so that the backing of the weatherstrip is captured in the T-slot as shown in FIG. 14. The weatherstrip then remains in the T-slot. Because the weatherstrip is overdriven at a speed higher than the speed at which the extrusion 14 is driven (for example 30% higher or faster in speed), the weatherstripping remains aligned with the ends of the sections or lineals of the extrusion as they are cut off in the station 28, as explained above in connection with FIGS. 1-10. The improvements in the extrusion apparatus by virtue of the overdrive of the weatherstrip 24 with respect to the extrusion is discussed above in connection with the embodiment of the insertion apparatus illustrated in FIGS. 1-10.

The insertion apparatus has a pair of insertion drive assemblies which are similar and insert the weatherstrip 24 into a pair of extrusion members at the same time. Only one of these assemblies 102 is described in detail herein. These assemblies include a drive wheel or roller 104 which engages the extrusion 14 and an insertion wheel or roller 106 which engages the weatherstrip 24. The weatherstrip enters the apparatus from the left and may be unwound from a reel thereof. The weatherstrip is guided by fingers 107 extending inwardly of the openings in the guide plates 38a, b, and c (see FIG. 11).

Figure 15:
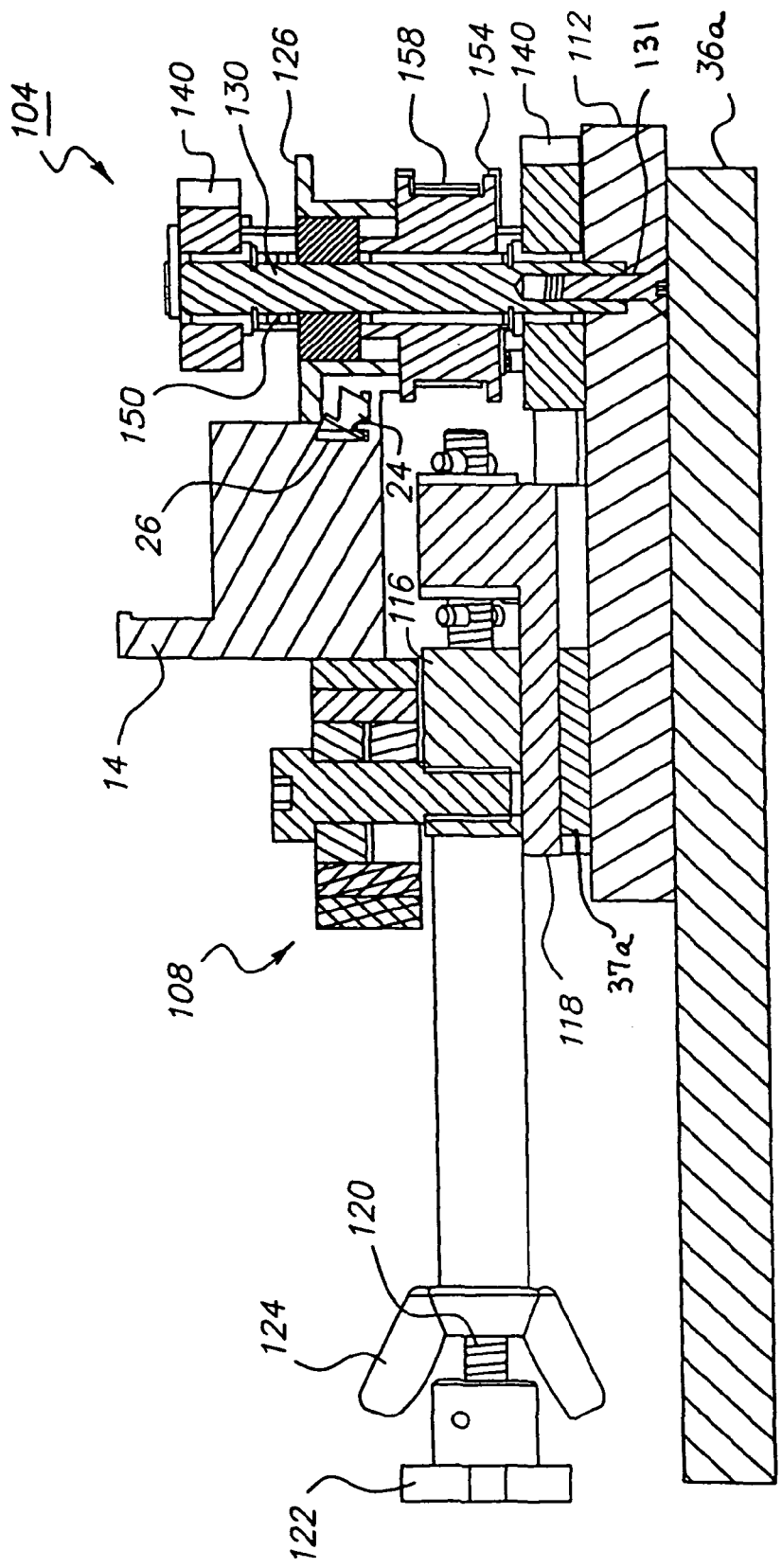
FIG. 15 is a sectional view illustrating the insertion roller assembly and the pressure roller positioned in process of inserting a weatherstrip into an extrusion member, the view being taken along the line 15-15 in FIG. 12.

Another principal part of the insertion apparatus is the pressure roller assembly 108 which is disposed on the opposite side of the extrusion from the drive wheel or roller 104 and in line with the axis of rotation of the drive roller 104 (see also FIG. 15). Both the insertion wheel and roller assembly 102, and the pressure roller assembly 104 are mounted on a support plate 112 which is assembled on the underplate 36 by fastener bolts 114. The plate 36a and the spacer 37 may be mounted on a screw assembly 118 on the lower plate 36b so as to enable the vertical height of the entire insertion apparatus 22a to be adjusted.

Figure 18:
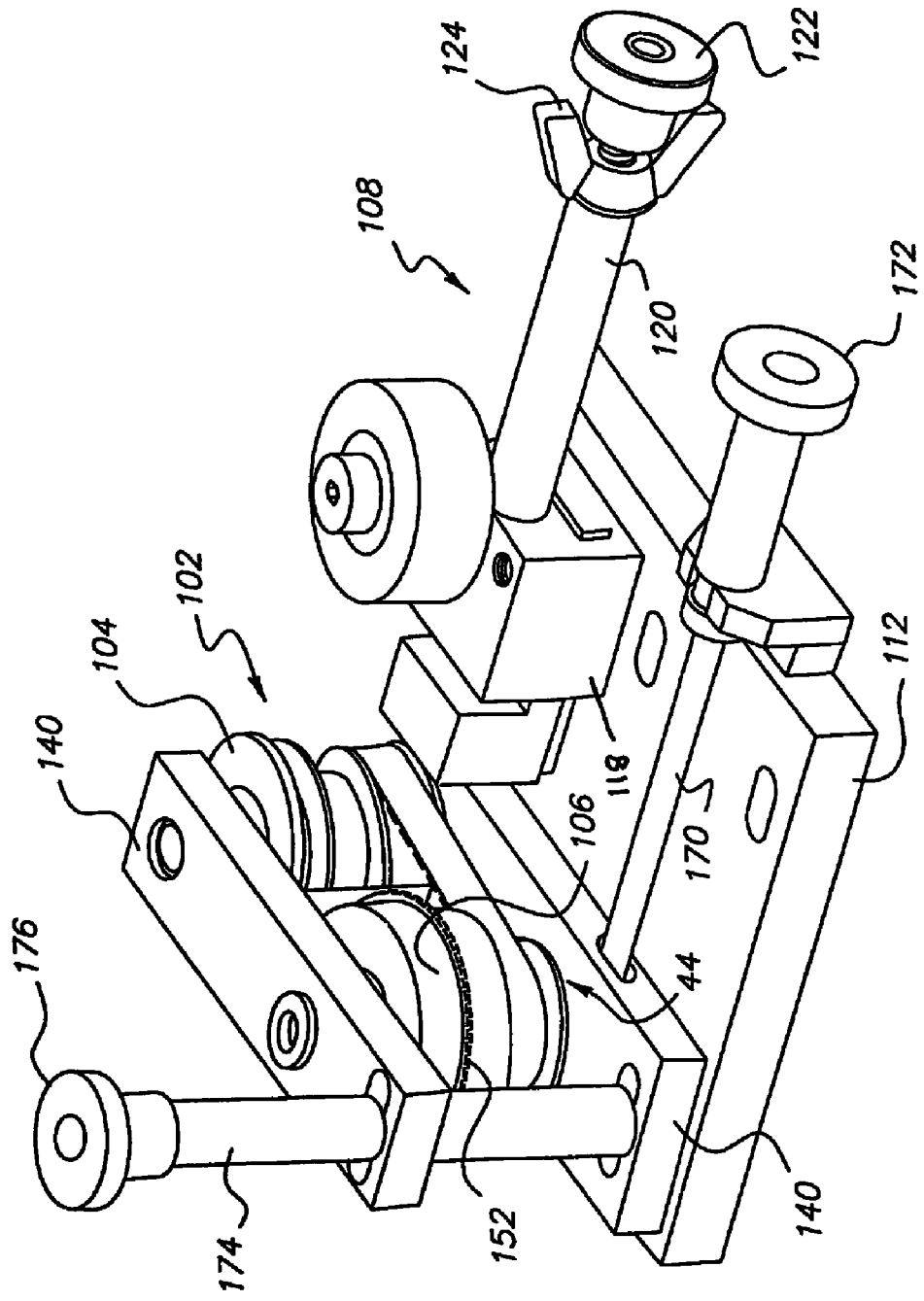
FIG. 18 is a view of the insertion wheel and drive roller assembly and the pressure roller assembly with other parts of the insertion apparatus removed to illustrate the relationship of these assemblies and the operation thereof in the insertion apparatus.

The insertion drive assembly 102 is pivotable about the axis of rotation of the drive roller 104 or an axis parallel thereto so as to adjust the position of the insertion wheel 106. As shown in detail in FIG. 15, the drive roller 104 is rotatable on a shaft 130 fastened by a bolt 131 to the plate 112 the entire assembly is pivotable about the axis of the shaft 130. The pressure roller assembly 108 is movable laterally toward and away from the axis of rotation of the drive roller 104 and its drive wheel 126. Se especially FIGS. 15, 18, and 19 so as to clamp the extrusion between the drive roller 104 and the pressure roller 108. The pressure roller 108 may be a rubber tired roller. As shown in FIG. 18, this roller is mounted rotatably in a block 116 which is movable in a dove-tail slot of a support 118 so as to be adjustable by means of a threaded shaft 120 having a knob 122 which is locked in adjusted position by a wing nut 124.

The drive roller assembly 104 includes the wheel or roller 126 which engages the side of the extrusion 14 along the periphery of the roller. This periphery may be knurled. Also, the driving wheel 126 may be greater in height or width than shown in FIG. 15 to accommodate different profiles of the extrusion members which are handled by the apparatus 22a.

Figure 16:
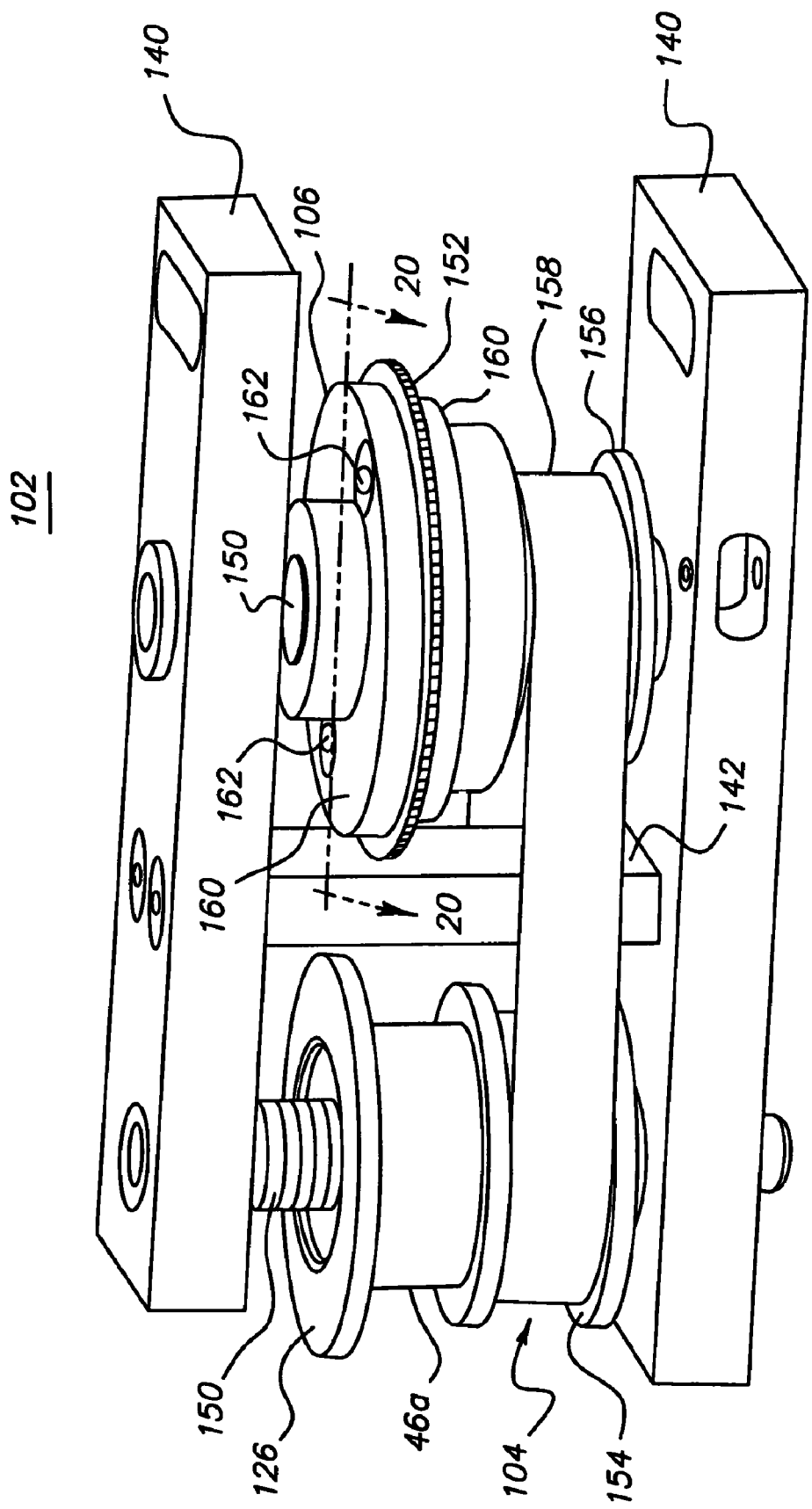
FIG. 16 is a perspective view of the insertion drive assembly which includes the drive roller assembly and the insertion wheel assembly together with the transmission coupling these assemblies.
Figure 17:
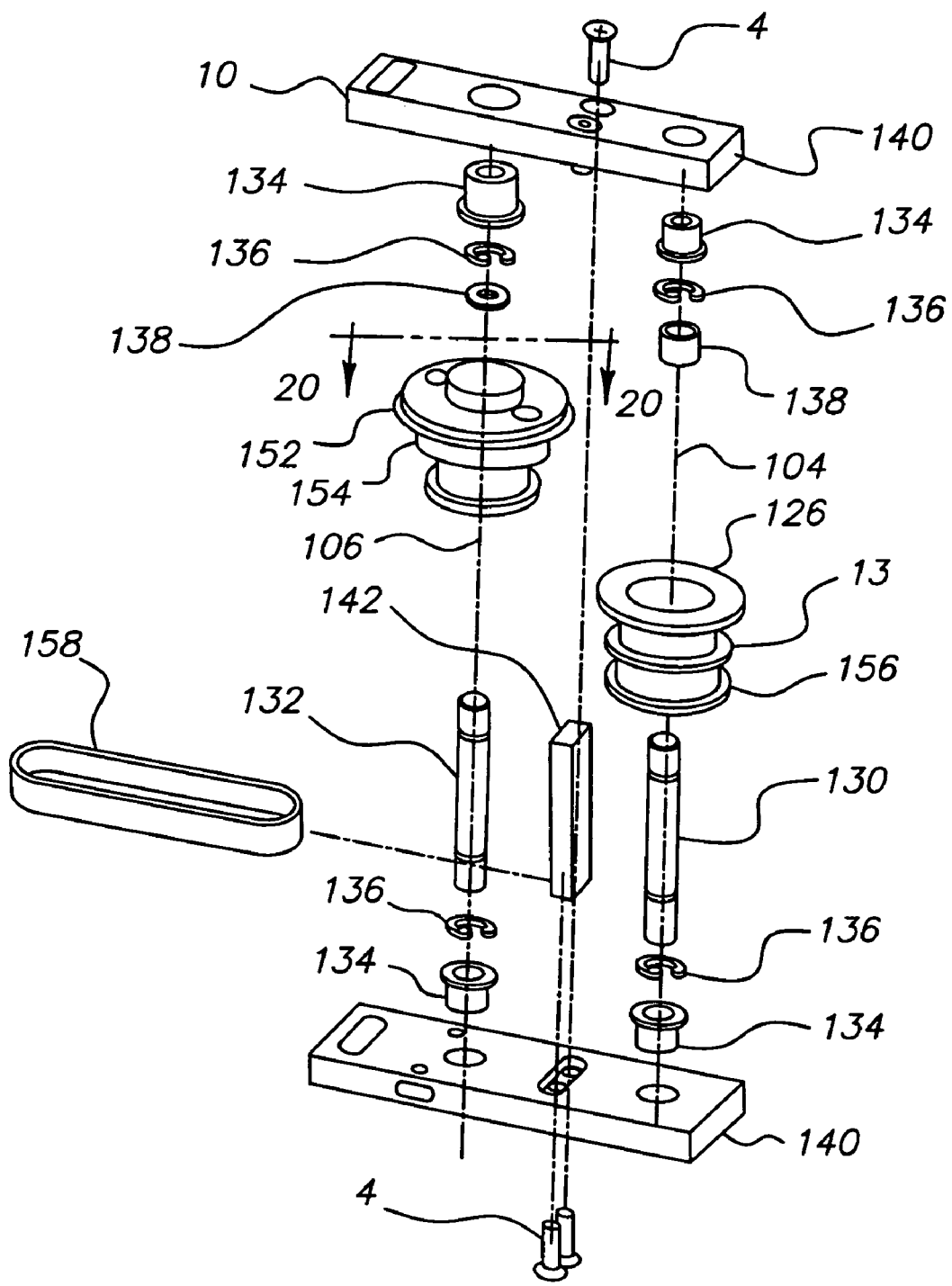
FIG. 17 is a perspective, exploded view of the assembly shown in FIG. 16.

The insertion drive assembly 102 is also shown in FIGS. 16 and 17. The insertion wheel assembly 106 is rotatable on a shaft 132, and the drive wheel or roller assembly 104 is rotatable on shafts 130. These shafts are held by arrangements of bushings 134 and retaining rings 136, as well as other shims and bushings 138 between bars or blocks 140. These blocks 140 are held in spaced relationship in the assembly by a spacer bar 142.

The shafts 130 and 132 are disposed inside of bushings 150 which may be made up of stacks of discs. The drive wheel 126 and a rotary saw blade 152 which provides the insertion wheel assembly are disposed in force-fit relationship with pulleys 154 and 156. These may be ribbed timing pulleys. A timing belt 158 is entrained around these pulleys. The pulleys and the timing belt serve as a transmission for transferring the rotation of the drive wheel 126 to the insertion wheel 106.

In order to obtain overdrive operation, the diameter of the pulley of the insertion wheel assembly 106 is larger than the diameter of the pulley 154 of the drive roller assembly 104. For example, in order to obtain a 30% overdrive (the weatherstrip 24 being driven 30% faster than the extrusion 14) the diameter of the pulley of the insertion wheel assembly 106 may be 2 inches, while the drive roller pulley 154 diameter may be 1.625 inches. Both the differences in diameter of the pulleys 154 and 156 and the differences in diameter of the drive wheel 126 and the insertion wheel 152 contribute to the amount of overdrive. Preferably, as noted above, the overdrive provides for the weatherstrip 24 moving 30% faster than the extrusion 14. It will be apparent from FIGS. 15, 16 and 17 that the insertion wheel assembly 106 and the drive wheel assembly 104 are provided by sandwiching the insertion disc 152 (the rotary saw blade) between discs 160 of the insertion wheel assembly 106 (see also FIG. 20). The flanged cylinders which make up the pulleys 154 and 156 and the drive wheel 126 as well as the discs 160 of the insertion wheel assembly 106 may also be held together by force-fit, and with additional bolts 162 in the case of the saw blade 152 which provides the insertion wheel.

Figure 19:
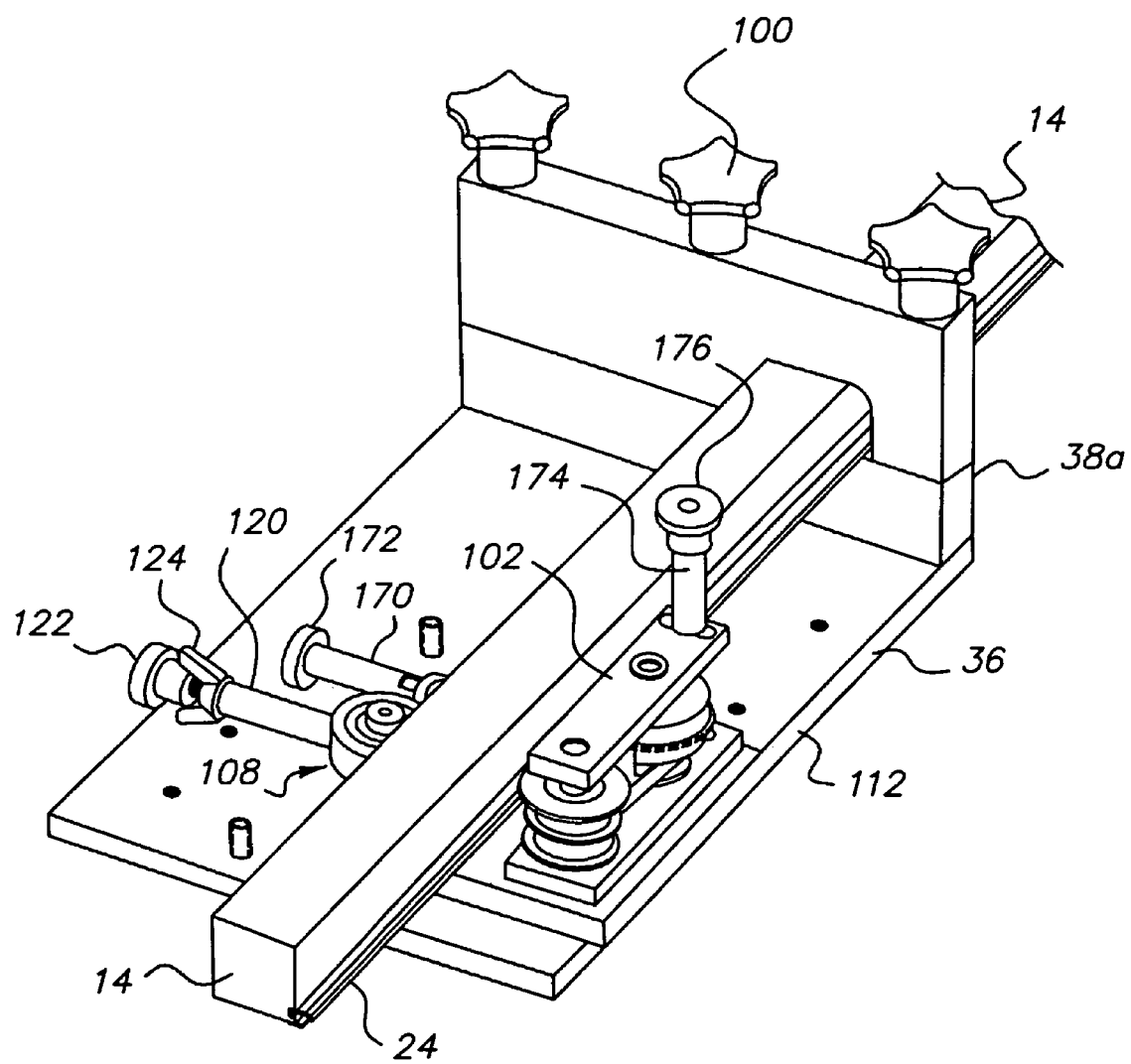
FIG. 19 is a perspective view of the insertion wheel and roller assembly and the pressure roller assembly taken from a side opposite to the side of these assemblies which is shown in FIG. 18.
Figure 20:
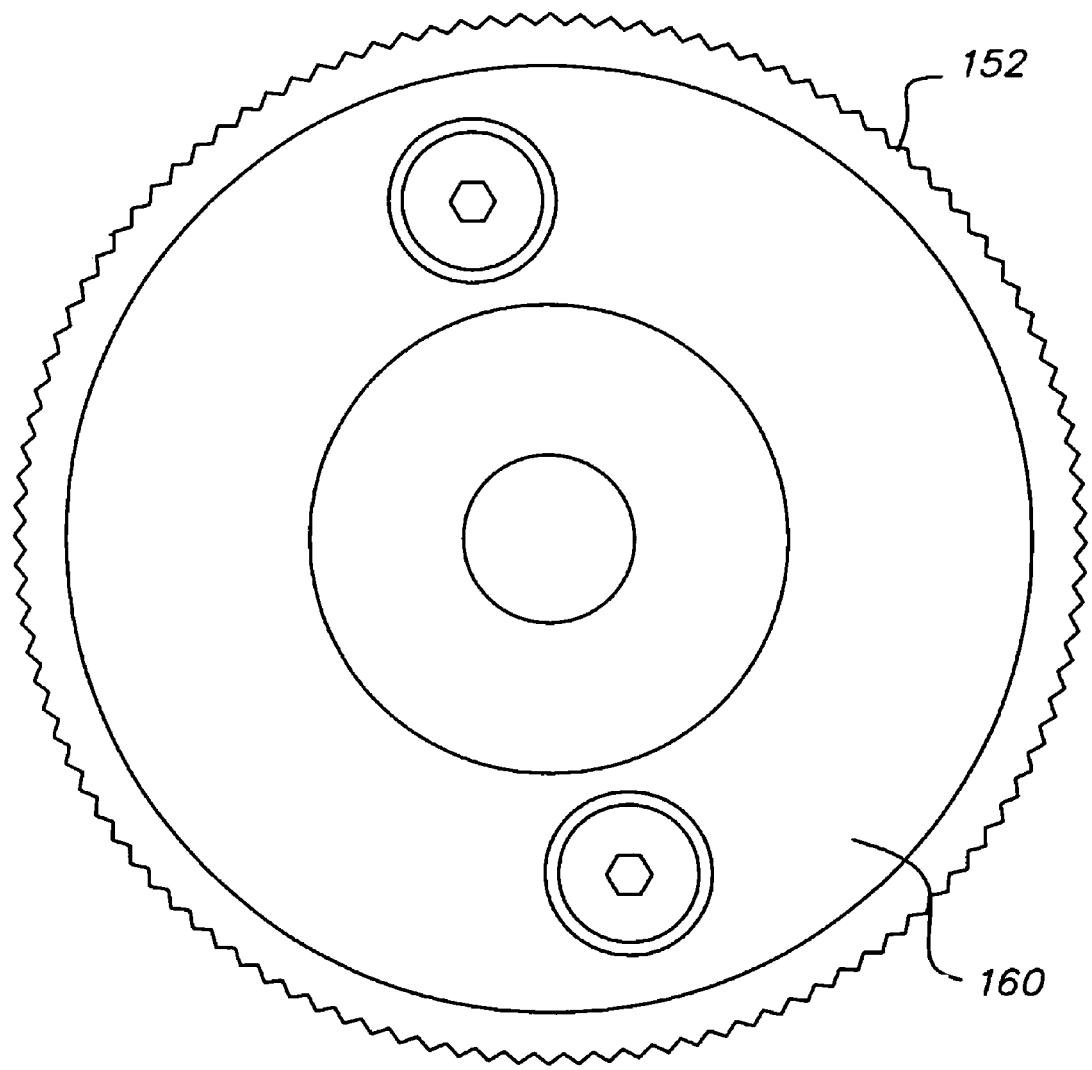
FIG. 20 is a sectional view taken along the line 20-20 in FIG. 16 illustrating the insertion wheel provided by a circular saw blade disc.

As best shown in FIGS. 18 and 19, the insertion drive assembly 102 is pivoted by an adjusting bolt 170 which is turned by a knob 172. The angle to which the assembly 102 is pivoted provides for the location of the insertion wheel into the T-slot so as to bring the weatherstrip 24 into captured relationship with the extrusion 14 in the slot 26. Once the desired pivoting angle is obtained, the drive assembly 102 is locked in place by the pull down bolt arrangement 174 which passes through slots in the locks 140 and is screwed with the aide of a knob 176 into the plate 112. Also, the pressure roller assembly 108 is then clamped in place and the apparatus 22*a* is ready for continual operation as the extrusions are produced in the extruder and pulled to the insertion apparatus by the pulling mechanism in the station 28 (see FIG. 1).

Variations and modifications in the herein described apparatus and its method (and system) of operation, within the scope of the invention, will undoubtedly suggest themselves to those skilled in the art. For example, instead of gear transmissions and arrangements of a belt and pulleys, electromechanically synchronized shafts may be used. Accordingly the foregoing description should be taken as illustrative and not in a limiting sense.

The invention claimed is:

1. A weatherstrip insertion apparatus for inserting weatherstripping into a member as the member moves continuously along a linear path toward a station where the member is cut into sections, said apparatus comprising an insertion wheel engagable with said weatherstripping for inserting said weatherstripping continuously into said member, at least one roller frictionally engaging said member and rotatable by said member as said member is driven toward said station, and a transmission rotatably coupling said at least one roller in driving relationship with said wheel, and wherein a plurality of rollers including said at least one roller are provided frictionally engagable with said member along opposite sides thereof to provide a non-slip relationship between said plurality of rollers and said member, said transmission rotatably coupling said at least one rollers to said wheel.

2. The apparatus according to claim 1 wherein said wheel is on an arm pivotable about an axis on which said roller rotates, said transmission being contained in said arm, said arm being yieldably biased to pivot towards said member bringing said wheel into said member.

3. The apparatus according to claim 1 further comprising first and second arms carrying said transmission and being pivotable about an axis about which said at least one of said rollers is rotatable, said first arm carrying said wheel and said second arm carrying another of said plurality of rollers, and said arms being yieldably connected to each other to pivot said arms toward each other biasing said wheel and said another of said rollers toward the opposite sides of said member.

4. The apparatus according to claim 3 wherein said member has a slot which receives said weatherstripping upon insertion therein by said wheel, a support over which said member passes, said support carrying said insertion apparatus.

5. The apparatus according to claim 4 wherein said at least one roller is rotatably mounted on said support and rotatable about an axis, an arm pivotably mounted for rotation about said axis and carrying said wheel toward and away from a side of said member, said arm carrying said transmission.

6. The apparatus according to claim 5 further comprising said one roller of said plurality of rollers and said plurality of rollers including a second roller, a second arm pivotably mounted on said axis and carrying the second roller along a side of said member opposite to said side engaged by said one roller, said arm being disposed between said member and said support, and a spring connected to said arms toward and away from said opposite sides of said member.

7. The apparatus according to claim 1 wherein said member is an extrusion continuously extruded by an extruder spaced upstream from said insertion apparatus along said path.

8. The apparatus according to claim 1 wherein said transmission drives said wheel at a tangential speed at the periphery of said wheel which is equal or faster than the speed of travel of the member along said path.

9. The apparatus according to claim 8 wherein said transmission is a gear train.

10. The apparatus according to claim 1 wherein said transmission contains a first gear train including gears rotatable with said rollers interconnected by spur gears, and a second gear train between one of said rollers and a gear rotatable with said insertion wheel.

11. The apparatus according to claim 3 wherein said transmission comprises gear trains in each of said arms including gears rotatable with said rollers and a gear rotatable with said wheel, said gear rotatable with said roller having said pivot axis being common to both of said gear trains.

12. The apparatus according to claim 11 wherein said gears have ratios selected to provide said wheel with a rotational speed so that the tangential speed of said wheel is equal or greater than the speed of said member along said path.

13. The method of inserting weatherstripping with a wheel into a slot in an extrusion from which frame components of windows and other fenestration products are fabricated and which said extrusion moves out of an extruder in which the extrusion is formed, which method comprises the steps of:
   pressing a roller against the extrusion so that the roller is rotated by the extrusion as the extrusion moves away from the extruder;
   transferring rotation of said roller to said wheel with a transmission so that said weatherstripping is driven by said wheel at least the same speed as said extrusion; and
   carrying out said rotation transferring step with another roller rotatable about said axis which engages the same side of said extrusion as said wheel and which is coupled to said transmission.

14. The method according to claim 13 further comprising pivoting said wheel and said roller towards opposite sides of said extrusion, one of which sides contains said slot.

15. The method according to claim 14 further comprising the step of carrying out said pivoting step by mounting said roller and said wheel on arms which pivot about an axis.

16. The method according to claim 15 further comprising the step of carrying out said rotation transferring step with said transmission in said arms extending between a pivot axis and said wheel and said roller.

17. The method according to claim 13 further comprising carrying out said pressing step with the aid of a spring which pivots said arms toward each other.

18. The method according to claim 13 wherein the weatherstripping is smaller than the slot and is slippable longitudinally of the extrusion and further comprising the step of slipping said weatherstripping inside said slot longitudinally of said extrusion after insertion therein.

19. The system according to claim 18 wherein said weatherstrip is slippable in said slot longitudinally of said member, and wherein said inserted weatherstripping is adjustably disposed out of alignment with the ends of said sections to facilitate assembly of said sections into windows or doors.

20. The system according to claim 19 wherein said inserted weatherstripping is adjustably disposed out of alignment with the ends of said sections to facilitate assembly of said sections into windows or doors.

21. A system for inserting weatherstripping into a member comprising:
means for inserting a moving weatherstrip into a slot of a moving member, in which the weatherstrip moves at a speed equal to a faster than the speed of said moving member; and
means for cutting said member with said inserted weatherstrip into one or more sections having ends, in which at said ends said member and said weatherstrip inserted therein are substantially aligned with each other or the weatherstrip extends past the end of said member.

22. A weatherstrip insertion apparatus for inserting weatherstripping into a member as the member moves continuously along a linear path toward a station where the member is cut into sections, said apparatus comprising an insertion wheel engagable with said weatherstripping for inserting said weatherstripping continuously into said member, at least one roller frictionally engaging said member and rotatable by said member as said member is driven toward said station, and a transmission rotatably coupling said roller in driving relationship with said wheel, said insertion wheel having a periphery, and said one roller being in an assembly which is pivotable about an axis of rotation of said one roller toward said member and to bring said wheel along the periphery thereof into engagement with said weatherstrip along one side of a backing from which a sealing element of said weatherstrip extends for inserting said weatherstrip into a slot into said member.

23. The apparatus according to claim 22 wherein said periphery of said wheel is provided by a rotary saw blade of which said wheel is comprised.

24. The apparatus according to claim 22 wherein a mechanism is provided for pivoting said assembly which said mechanism locks said wheel in a position spaced from a bottom surface of said slot to capture said backing in said slot.

25. A weatherstrip insertion apparatus for inserting weatherstripping into a member as the member moves continuously along a linear path toward a station where the member is cut into sections, said apparatus comprising an insertion wheel engagable with said weatherstripping for inserting said weatherstripping continuously into said member, at least one roller frictionally engaging said member and rotatable by said member as said member is driven toward said station, and a transmission rotatably coupling said roller in driving relationship with said wheel,
another roller disposed on a side of said member opposite to a side thereof which is engaged by said one roller, said at least one roller and said another roller being opposed to each other, and a mechanism for bringing said at least one roller and said another roller into non-slip clamped relationship with said member.

26. The apparatus according to claim 25 wherein said mechanism is provided by a block on which said another roller is rotatably mounted, and a shaft extending through said block for moving said block and said another roller to bring said another roller into a position for providing said non-slip clamped relationship, said shaft having a locking mechanism for locking said block and said another roller in said position.

27. The apparatus according to claim 25 wherein said insertion and said one roller each include pulleys rotatable therewith, and said transmission includes said pulleys and a belt coupling said pulleys, said pulley rotatable with said one roller being sufficiently greater in diameter than the pulley rotatable with said insertion wheel to enable said weatherstrip to be driven in overdrive relationship with said member when inserted therein wherein said weatherstrip travels at a lineal speed greater than the lineal speed of said member.

28. The apparatus according to claim 27 wherein said diameter of said insertion wheel is also greater than the diameter of said one roller to provide said overdrive relationship.

* * * * *